United States Patent
Beaujot

(10) Patent No.: US 10,051,781 B2
(45) Date of Patent: Aug. 21, 2018

(54) AIR SEEDER MANIFOLD WITH IMPROVED DISTRIBUTION UNIFORMITY

(71) Applicant: SEEDMASTER MANUFACTURING LTD., Emerald Park (CA)

(72) Inventor: Norbert Beaujot, Emerald Park (CA)

(73) Assignee: SeedMaster Manufacturing Ltd., Emerald Park, SK (CA)

( * ) Notice: Subject to any disclaimer, the term of this patent is extended or adjusted under 35 U.S.C. 154(b) by 0 days.

(21) Appl. No.: 15/297,401

(22) Filed: Oct. 19, 2016

(65) Prior Publication Data

US 2017/0118906 A1 May 4, 2017

(30) Foreign Application Priority Data

Nov. 3, 2015 (CA) ..................... 2911182

(51) Int. Cl.
| | |
|---|---|
| B65G 53/52 | (2006.01) |
| A01C 7/10 | (2006.01) |
| A01C 7/04 | (2006.01) |
| A01C 7/06 | (2006.01) |
| A01C 7/08 | (2006.01) |

(52) U.S. Cl.
CPC ............ *A01C 7/105* (2013.01); *A01C 7/042* (2013.01); *A01C 7/06* (2013.01); *A01C 7/082* (2013.01); *A01C 7/084* (2013.01); *Y02P 60/16* (2015.11)

(58) Field of Classification Search
CPC ....... B65G 53/528; A01C 7/042; A01C 7/082; A01C 7/084; A01C 7/105; F23K 3/02
USPC ............... 406/181, 183; 137/561 A
See application file for complete search history.

(56) References Cited

U.S. PATENT DOCUMENTS

| | | | | |
|---|---|---|---|---|
| 4,436,459 A | * | 3/1984 | Caldwell ............ | B65G 53/528 406/181 |
| 4,562,968 A | * | 1/1986 | Widmer ............... | A01C 15/04 111/175 |
| 4,575,284 A | | 3/1986 | Kelm | |
| 5,975,141 A | * | 11/1999 | Higazy ................ | F23K 3/02 138/45 |
| 5,979,343 A | * | 11/1999 | Gregor ................ | A01C 7/081 111/175 |
| 5,980,163 A | | 11/1999 | Gregor et al. | |

(Continued)

FOREIGN PATENT DOCUMENTS

CA 2111611 6/1995

*Primary Examiner* — William R Harp
(74) *Attorney, Agent, or Firm* — Nixon & Vanderhye P.C.

(57) ABSTRACT

A manifold apparatus for an air seeder includes a manifold housing defining a output ports equally spaced around a perimeter thereof. An input port is defined in a bottom side of the manifold housing, and an input conduit extends downward therefrom. A distributor component is formed by a bottom side of a top plate of the manifold housing above the input port and directs product granules moving upward in an air stream in the manifold interior outward toward the perimeter of the manifold housing. A relative lateral position of the distributor component with respect to the input port is adjustable, and interference members extend an adjustable distance into the input conduit and/or manifold interior to contact the particles and change their flow path. The variables are manipulated to achieve positions where a rate of product flow through each output port is within a selected range.

13 Claims, 3 Drawing Sheets

(56) References Cited

U.S. PATENT DOCUMENTS

Figure 1:
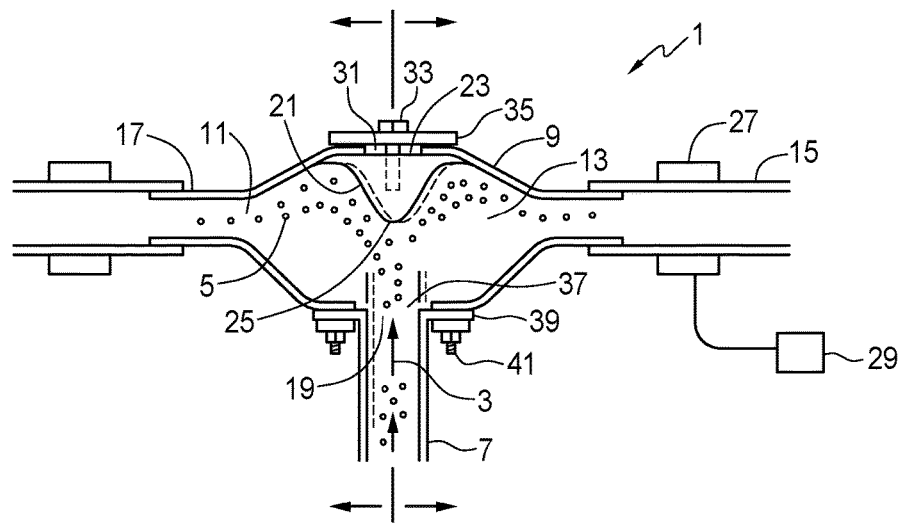

| | | | | |
|---|---|---|---|---|
| 6,116,284 A | * | 9/2000 | Murray | A01C 7/082 |
| | | | | 111/34 |
| 6,227,770 B1 | * | 5/2001 | Poncelet | A01C 7/082 |
| | | | | 406/195 |
| 6,290,433 B2 | | 9/2001 | Poncelet et al. | |
| 8,894,330 B2 | * | 11/2014 | Gluch | A24C 5/391 |
| | | | | 406/181 |
| 8,955,445 B2 | * | 2/2015 | Riffel | A01C 7/084 |
| | | | | 111/175 |
| 2014/0216315 A1 | | 8/2014 | Beaujot et al. | |
| 2015/0098767 A1 | | 4/2015 | Beaujot et al. | |

\* cited by examiner

AIR SEEDER MANIFOLD WITH IMPROVED DISTRIBUTION UNIFORMITY

This application claims priority to CA Patent Application No. 2,911,182 filed 3 Nov. 2015, the entire contents of which is hereby incorporated by reference.

This disclosure relates to the field of agricultural air seeders and in particular improving the uniformity of product distribution to the furrow openers of air seeders.

BACKGROUND

Air seeders typically include an implement frame mounted on wheels, with a plurality of furrow openers mounted on the frame. The furrow openers can be moved from a raised non-operative position to a lowered operating position where the furrow openers engage the ground and create furrows. Agricultural products such as seed and various types of fertilizer are carried in separate tanks which can be mounted on the implement frame or on a cart towed along with the implement frame.

Metering devices dispense products from the tanks into one or more air streams that carry the products through a network of hoses and manifolds to the furrow openers where same are deposited in the furrows. In order to achieve a uniform application rate of agricultural products on the field, the rate of product flowing from each output port of each manifold to each furrow opener should be the same.

In a typical configuration, the manifold is a short cylindrical shape and is mounted on top of a vertical tower section of the input conduit. The input port is at the center of the bottom plate of the manifold, and the output ports are equally spaced around the cylindrical wall of the manifold between top and bottom plates. The number of output ports will vary with the particular application.

In order to achieve substantially equal division of the agricultural products entrained in the air stream, it is desirable to have the products randomly distributed across the cross-section of the input conduit as it enters the manifold input port. Since the air stream entering the manifold moves more or less equally out of the manifold through each output port, an imbalance in the amount of product in one part of the air stream compared to another will result in a similar imbalance in the quantity of agricultural products carried out through one output port compared to another.

The vertical tower section helps to move the suspended product into a more even or centered distribution across the cross section of the tower portion of the input conduit. The bottom end of the tower section is connected through a curved elbow to a horizontal section of the input conduit. In the horizontal section the agricultural products tend to move toward the bottom side of the conduit in response to gravity, and the vertical tower section is designed to take out the effects of gravity. As the air flow moves around the curve elbow at the bottom of the manifold system the product tends toward the outside of the curve giving an offset distribution of product, and various means are then used to shift the product to a random or centered distribution.

For example, U.S. Pat. No. 4,575,284 to Kelm provides projections or dimples extending inward from the wall of the vertical tower section to help the granular material reach the manifold input port in a centered, accurate stream. Canadian Patent Number 2,111,611 to Bourgault discloses a seed centering system comprising one or more tapered centering rings which direct the agricultural products away from the walls toward the center of the horizontal and vertical tower sections of the primary conduit.

A cone with curved walls commonly extends down from the top plate toward the input port to redirect the upwardly moving air stream and entrained product to exit horizontal through the output ports. U.S. Pat. No. 6,290,433 to Poncelet discloses a manifold where the input port gradually tapers inwardly in the direction of the flow to accelerate and centre the flow as it enters the manifold. Poncelet also discloses a manifold top plate or cap with a downward extending point centered on the central axis of the input port. A series of smoothly curved grooves and ridges extending from the point upward and curving 90 degrees to connect the grooves with the output ports. Corresponding grooves and ridges are provided in the bottom plate and the ridges in the top and bottom plates cooperate to essentially form substantially separate channels from an open area just above the input port near the point to each output port.

United States Published Patent Application Number 2015/0098767 to the present inventor Beaujot discloses a manifold where the air stream contacts a downward oriented cone in the top plate and is directed into channels extending downward along outer walls of the manifold and then curving to direct the air stream horizontally through the output ports.

The volume and speed of the air stream in the input conduit varies to accommodate the wide range of product flow rates that must be carried through the networks. This variable, and others such as the properties of the particular product being carried make obtaining an air stream with the product uniformly distributed across the cross-section of the input conduit problematic.

Further complicating the problem is the variability in the back pressure present in the hoses leading downstream from the output ports of the manifold, which causes air, and the products entrained therein, to flow more readily out the output ports with lower back pressure. For example the lengths of the hoses from each manifold output port can vary resulting in unequal back pressure, and positioning of manifolds and furrow opener locations may make it difficult achieve equal hose lengths. United States Published Patent Application Number 2014/0216315 of the present inventor Beaujot discloses a manifold where the size of the output ports is adjustable to balance the back pressure at each output port, however while balancing the back pressure substantially equalizes the amount of air moving out through each output port, where the product is not equally distributed through the air stream, unequal rates of product still flow from the output ports.

SUMMARY OF THE INVENTION

The present disclosure provides a manifold apparatus for improving the uniformity of agricultural product distribution in air seeders that overcomes problems in the prior art.

In a first embodiment the present disclosure provides a manifold apparatus for an air seeder. The apparatus comprises a manifold housing enclosing a manifold interior, the manifold housing defining a plurality of output ports substantially equally spaced around a perimeter of the manifold housing, each output port adapted for connection to an output conduit. An input port is defined in a bottom side of the manifold housing, and a substantially vertically oriented input conduit extends downward from the input port. A distributor component is formed by a bottom side of a top plate of the manifold housing above the input port, the distributor component operative to direct product granules moving upward in an air stream in the manifold interior outward toward the perimeter of the manifold housing. A relative lateral position of the distributor component with respect to the input port is adjustable to achieve a tuned relative lateral position where a rate of product flow through each output port is within a selected range.

In a second embodiment the present disclosure provides a manifold apparatus for an air seeder. The apparatus comprises a manifold housing defining a plurality of output ports substantially equally spaced around a perimeter of the manifold housing, each output port adapted for connection to an output conduit. An input port is defined in a bottom side of the manifold housing and a substantially vertically oriented input conduit extends downward from the input port and carries an air stream entrained with product granules such that the air stream entrained with product granules flows upward into the manifold interior and out through the output ports. A plurality of interference members wherein each interference member is adjustable with respect to the manifold apparatus such that same can be moved from an inoperative position outside an interior of the manifold apparatus to an operative position extending an interference distance from an inner surface of a wall of the manifold apparatus into a path of the air stream entrained with product granules, and the interference distance for each interference member is adjustable. A rate of product flow through each output port is changed by adjusting the interference distance of the interference members.

The disclosed manifold apparatus adjusts to change the path of the product granules passing through the apparatus to a greater or lesser degree to change the rate of flow of product granules through each output port and to achieve improved product distribution uniformity from the output ports.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

FIG. 1 is a schematic sectional side view of an embodiment of the manifold apparatus of the present disclosure, with a downwardly extending top plate and adjustably positioned input conduit, for use with an air seeder;

FIG. 2 is a schematic top view of the embodiment of FIG. 1 with the distributor component substantially centered;

FIG. 3 is a schematic top view of the embodiment of FIG. 1 with the distributor component offset;

FIGS. 4A-4C show schematic side views of different downwardly extending top plates forming distributor component shapes that can be used with the embodiment of FIG. 1;

FIG. 5 is a schematic sectional side view of an alternate embodiment of the manifold apparatus of the present disclosure, with an upwardly extending top plate and adjustably positioned choke plate forming input conduit, for use with an air seeder;

FIG. 6 is a schematic bottom view of the choke plate of the embodiment of FIG. 5 with the choke plate substantially centered;

FIG. 7 is a schematic bottom view of the choke plate of the embodiment of FIG. 5 with the choke plate offset;

FIG. 8 is a schematic sectional side view of the oversize hole adjustment for the choke plate of the embodiment of FIG. 5;

FIG. 9 is a schematic sectional side view of a manifold housing with a flat top plate;

FIG. 10 is a schematic sectional side view of a further alternate embodiment of the manifold apparatus of the present disclosure for use with an air seeder where a plurality of interference members are adjustable to change the path of the product granules carried in the air stream, and so to change the flow rate through each output port;

FIG. 11 is a schematic sectional top view of the input conduit showing the interference members spaced around the conduit;

FIG. 12 is a schematic top view of the embodiment of FIG. 10.

DETAILED DESCRIPTION OF THE ILLUSTRATED EMBODIMENTS

FIGS. 1-3 schematically illustrate an embodiment of a manifold apparatus 1 of the present disclosure for use on an air seeder. The air seeder fan directs an air stream 3 carrying granules 5 of agricultural products such as seed and/or fertilizer, through an input conduit 7 into the manifold housing 9 which divides the air stream 3 and product granules 5 carried therein and directs same out through output ports 11.

The manifold apparatus 1 comprises the manifold housing 9 enclosing a manifold interior 13, and defining a plurality of output ports 11 substantially equally spaced around a perimeter of the manifold housing 9. Each output port 11 is adapted for connection to an output conduit 15. The illustrated output ports 11 include an outward extending cylindrical tube 17 and the output conduits 15 are shown simply sliding over the tubes 17 where same may be clamped if the fit is not tight enough to secure them.

An input port 19 is defined in a bottom side of the manifold housing 9, and the substantially vertically oriented input conduit 7 extends downward from the input port 19 and is connected to receive the air stream 3 from air seeder fan. A distributor component 21 is formed by the bottom side of a top plate 23 of the manifold housing 9 above the input port 19. The distributor component 21 is operative to direct product granules 5 moving upward in the manifold interior 13 outward toward the perimeter of the manifold housing 9.

The distributor component 21 shown in FIG. 1 is provided by a downwardly extending top plate 23, where product granules 5 contact the bottom side of the downwardly extending top plate and are directed outward and upward toward the perimeter of the manifold housing 9. The illustrated distributor component 21 slopes upward and outward from a lower extremity 25 thereof. FIGS. 4A-4C schematically illustrate other contemplated shapes 21', 21", 21'" of the distributor component provided by downwardly extending top plates 23', 23", 23'".

In a conventional air seeder manifold the distributor component 21 is centered above the input port 19 and the lateral relationship between the two is fixed. With the distributor component 21 and input port 19 centered with respect to each other an air stream moving up the input conduit 7 will contact the center of the distributor component 21 at the lower extremity 25 thereof and the air flow will generally flow equally to all portions of the perimeter of the manifold housing 9. The product granules 5 are however often not consistently mixed throughout the air stream. Depending on the air volume and the characteristics of the agricultural products being carried in the air stream, more product granules may be carried on one side of the air stream than on the other, such that even if an equal amount of air is directed out through each output port 11, an unequal rate of product flow of granules 5 is flowing through each output port 11.

In the manifold apparatus the relative lateral position of the distributor component 21 with respect to the input port 19 is instead adjustable to achieve a tuned relative lateral position where a rate of product flow through each output port 11 is within a selected range. It is contemplated that for different agricultural products and different operators the range selected will vary but in any event the product flow rates will be in a range that is acceptable to the operator. Conventional air seeder manifolds have product flow rate variations of 30% or more between output ports 11. By manipulating the relative positions of the distributor component 21 and the input port 19 in the apparatus 1 these variations can be reduced significantly.

The illustrated apparatus 1 includes a product flow sensor 27 corresponding to each output port 11. Each product flow sensor 27 is operative to measure the rate of product flow through the corresponding output port 11. Suitable product flow sensors are available that provide an accurate reading of product flow such as the product flow meter manufactured by Digitroll Kft. of Budapest, Hungary which is operative to measure the rate of particle flow in a one inch diameter hose such as the output conduits 15 of a typical air seeder. The product flow sensors 27 are adapted to be attached to an output conduit 15 connected to the corresponding output port 11. A microprocessor 29 is connected to receive product flow rate information from each product flow sensor 27, and programmed to determine when the tuned lateral position of the distributor component 21 with respect to the input port 19 is achieved by determining that the rate of product flow through each output port 11 is within the selected range.

The microprocessor 29 is programmed by trial and error by adjusting the relative position of the distributor component 21 with respect to the input port 19, and measuring the flow out of each output port 11, and adjusting the relative position until the tuned relative position is achieved where flow through each output port is within the selected range. It is also contemplated that an operator could catch and weigh the output from each output port 11, and compare the weights to make the adjustments of the relative positions.

In the illustrated apparatus 1, the distributor component 21 is laterally adjustable with respect to the manifold housing 9 such that the distributor component 21 can be moved to achieve the tuned relative lateral position with respect to the input port 19. The top side of the manifold housing 9 defines a top aperture 31 and the top plate 23 is fastened to seal the top aperture 31 and is movable, as indicated by the phantom lines in FIG. 1, with respect to the top aperture 31 by loosening the bolt 33 that passes through a washer plate 35 to secure the top plate 23 in the top aperture 31. Moving the top plate 23 in the top aperture 31 moves the bottom extremity 25 of the distributor component 21 with respect to the input port 19 such that the stream of product granules 5 moving upward in the manifold interior 13 contact a different portion of the distributor component 21 and are directed to a different portion of the perimeter of the manifold housing. Other movable attachments can be provided for the distributor component 21 as are known in the art.

Figure 2:
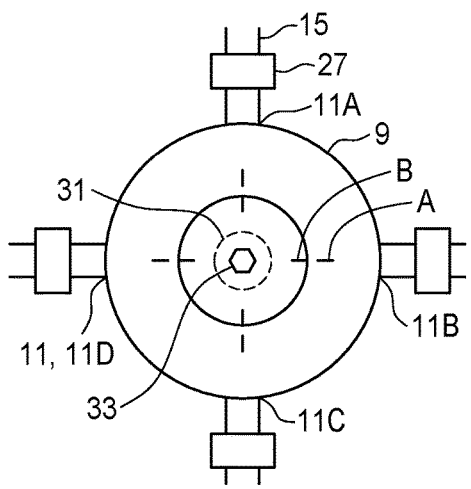

FIG. 2 is schematic top view of the apparatus 1 showing the bolt 33 centered in the top aperture 31 such that the distributor component 21 is substantially centered with respect to the input port 19. In this position of the distributor component 21 the air stream 3 will be directed substantially equally to each of the output ports 11.

Figure 3:
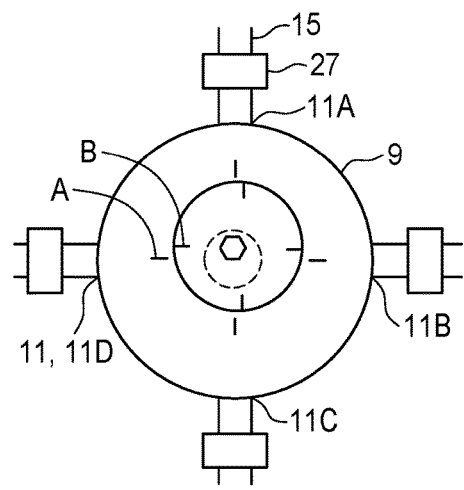
Figure 4A:
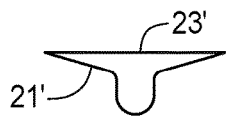
Figure 4B:
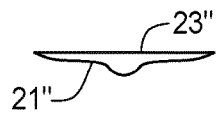
Figure 4C:
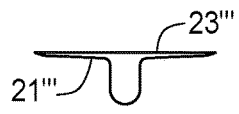

FIG. 3 is schematic top view of the apparatus 1 showing the bolt 33 offset in the top aperture 31 such that the distributor component 21 is offset with respect to the input port 19 as indicated by the phantom line in FIG. 1. In this position of the distributor component 21, more of the air stream 3, and the product granules 5 entrained therein, will be directed to output ports 11C, 11D and less to output ports 11A, 11B. By repeatedly measuring flow rate through each output port 11, either manually or using product flow sensors 27, and shifting the distributor component 21 appropriately, the product flow rates through each output port 11 can be brought to within the selected range. Corresponding adjustment marks A, B on the washer plate 35 and manifold housing 9 provide a visible measure of the movement of the distributor component 21 with respect to the manifold housing 9. Further measurement marks can also be provided to indicate the degree of movement.

Figure 5:
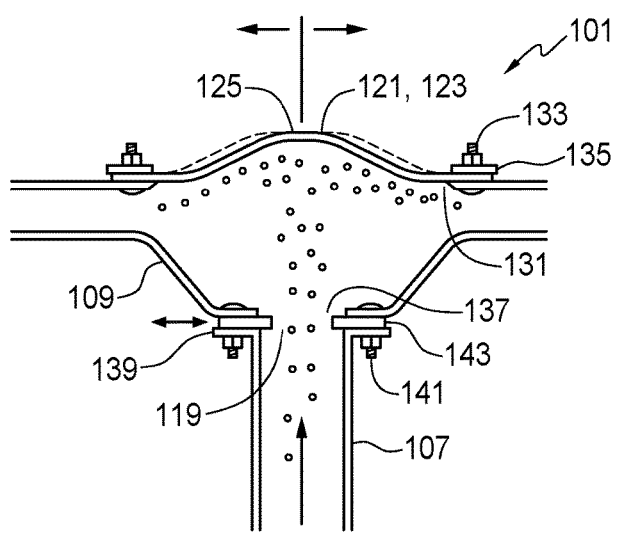

FIG. 5 schematically illustrates an alternate manifold apparatus 101 where distributor component 121 is provided by an upwardly extending top plate 123, where product granules 5 contact a bottom side of the upwardly extending top plate 123 and are directed outward and downward toward the perimeter of the manifold housing 109. The bottom side of the upwardly extending top plate 123 curves smoothly outward and downward from an upper extremity 125 thereof.

In the illustrated apparatus 101, the distributor component 121 is laterally adjustable with respect to the manifold housing 109 such that the distributor component 121 can be moved to achieve the tuned relative lateral position with respect to the input port 119. The top side of the manifold housing 109 defines a top aperture 131 and the top plate 123 is fastened to seal the top aperture 131 and is movable, as indicated by the phantom lines in FIG. 5, with respect to the top aperture 131 by loosening the nuts on the bolts 133 extending up from the manifold housing 109 and passing through oversize holes, as described below, and washer plates 135 to secure the top plate 123 in the top aperture 131. Other movable attachments can be provided for the distributor component 121 as are known in the art. As with the downwardly extending top plate 23 shown in FIG. 1, shifting the upwardly extending top plate 123 laterally will direct more or less air stream and product granules 5 to the output ports 11 on one side or the other of the manifold housing 9.

In the apparatus 1 of FIG. 1 the input port 19 is also laterally adjustable with respect to the perimeter of the manifold housing 9 such that either or both of the distributor component 21 and the input port 19 can be moved to achieve the tuned relative lateral position with respect to each other. The bottom side of the manifold housing 9 defines a bottom aperture 37 with a diameter greater than a diameter of the input port 19, and the input port 19 is defined by the top end of the input conduit 7. The top end of the input conduit 7 is fastened to the bottom side of the manifold housing 9 at an adjustable lateral position within the bottom aperture 37.

In the illustrated apparatus 1, a flange 39 extends outward from the top end of the input conduit 7 and is fastened to the bottom side of the manifold housing 9 by bolts 41 through oversize holes as described below, such that by loosening the nuts on the bolts 41, the position of the flange 39 with respect to the bolts 41 can be adjusted laterally, thus also shifting the input port 19 laterally. Shifting the input port 19 laterally will change the point of contact between the air stream 3 and product granules 5, moving out of the input port 19 and upward through the manifold housing 9, and the distributor component 21 and will cause a similar change in product flow rates through the output ports 11.

Figure 8:
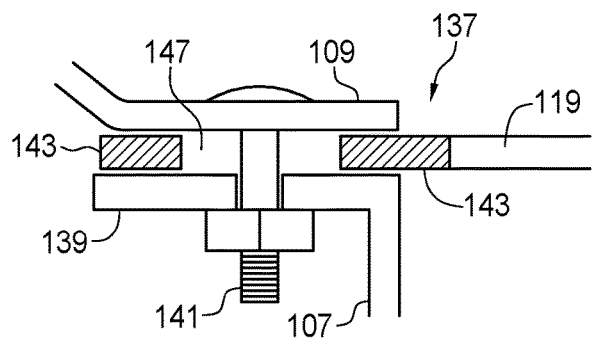

The apparatus 101 schematically illustrated in FIG. 5 also shows a somewhat different system for laterally adjusting the input port 119 with respect to the perimeter of the manifold housing 109. The manifold housing 109 defines a bottom aperture 137 with a diameter greater than a diameter of the input port 119, and the top end of the input conduit 107 also has a diameter greater than the diameter of the input port 107 and is fastened to the bottom side of the manifold housing 109 within the bottom aperture 137 and at a fixed position with respect to the bottom aperture 137, as illustrated in the schematic sectional view of FIG. 8. The input port 119 is defined by a choke plate 143 that is adjustably fastened between the bottom side of the manifold housing 109 and the top end of the input conduit 107 such that the input port 119 is within the bottom aperture 137.

Figure 6:
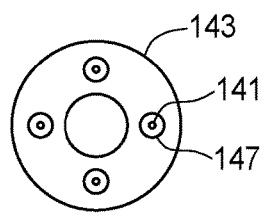
Figure 7:
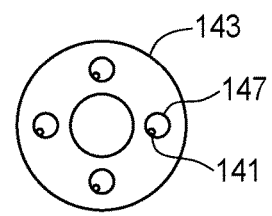

A flange 139 extends outward from the top end of the input conduit 107 and is fastened to the bottom side of the manifold housing 109 by bolts 141 through close fitting holes 145 in the flange 139 such that the position of the flange 139 with respect to the bolts 141 and with respect to the bottom side of the manifold housing 109 is fixed. The bolts 141 extend through oversize holes 147 in the choke plate 143 such that the choke plate 143 is movable laterally by loosening the nuts on the bolts 141. Thus the position of the choke plate 143 with respect to the bolts 141 and with respect to the bottom side of the manifold housing 109 can be adjusted, for example from the position shown in FIG. 6 to the position shown in FIG. 7.

Figure 9:
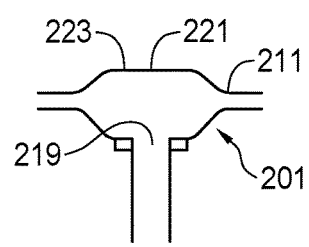

Moving the input port laterally, such as illustrated in the assemblies of FIG. 1 and FIG. 5, allows the relative position of the input port 219 and the distributor component 221 allows the flow rate through the output ports 211 to be changed where the distributor component 221 is provided by a flat top plate 223, as schematically illustrated in the manifold apparatus 201 shown in FIG. 9, where product granules contact a bottom side of the flat plate 223 and deflect downwards randomly where the air stream carries same out through the output ports 211.

Figure 10:
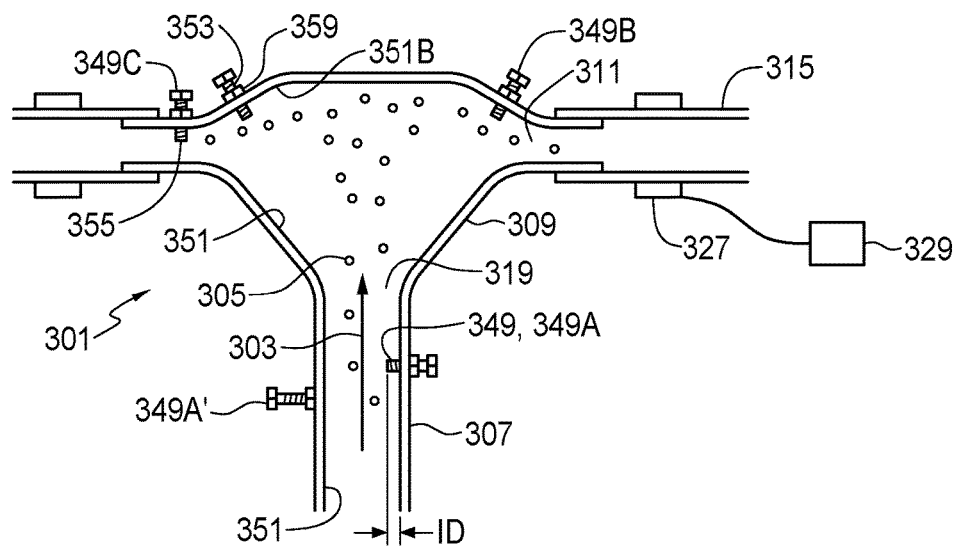
Figure 11:
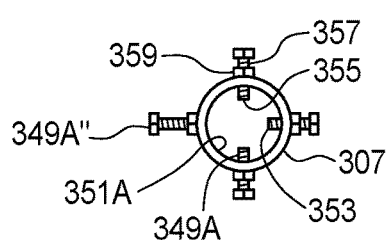
Figure 12:
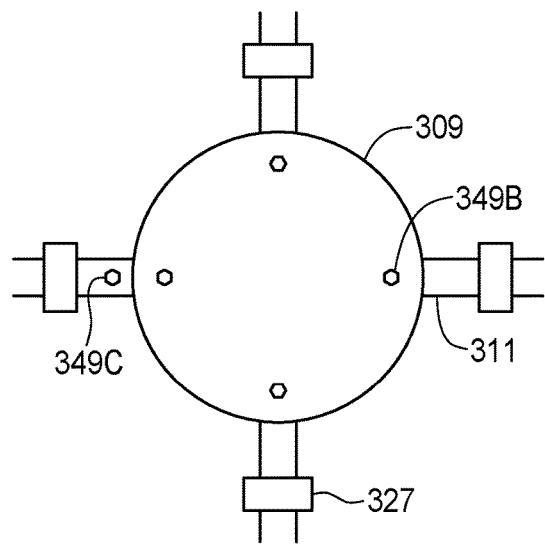

FIGS. 10-12 schematically illustrate a manifold apparatus 301 for an air seeder comprising a manifold housing 309 defining a plurality of output ports 311 substantially equally spaced around a perimeter of the manifold housing 309, each output port 311 adapted for connection to an output conduit 315. An input port 319 is defined in a bottom side of the manifold housing 309, and a substantially vertically oriented input conduit 307 extends downward from the input port 319 and carries an air stream 303 entrained with product granules 305 such that same flows into the manifold housing 309 and out through the output ports 311.

A plurality of interference members 349 each is adjustable with respect to the manifold apparatus 301 such that same can be moved from an inoperative position outside an interior of the manifold apparatus 301 to an operative position extending an interference distance ID from an inner surface 351 of a wall of the manifold apparatus 1 into a path of the air stream 303 entrained with product granules 305. The interference distance ID for each interference member is adjustable from zero, where the interference member is flush with, or outside of, the inner surface 351 of a wall of the manifold apparatus 1, to some distance out of the wall 351 into the interior of the manifold apparatus. Interference member 349A' for example is shown with an interference distance of zero. The rate of product flow through each output port 311 is changed by adjusting the interference distance ID of the interference members 349.

Input interference members 349A extend the interference distance ID into an interior of the input conduit 307 from an inner surface 351A of a wall of the input conduit 307. The input interference members 349A are generally equally spaced around the inner surface of the input conduit 307 and may be at varied vertical positions in the input conduit 307. The interference distance ID for each input interference member 349A is adjustable. Moving the input interference members 349A in and out of the input conduit 307 changes the path of product granules 305 contacting the input interference members 349 to a greater or lesser degree and so changes the flow rate through the output ports 311 as the product granules 305 are directed to different locations at the top of the manifold housing 309 and at different angles thereto. Thus the rate of product flow through each output port 311 is changed by adjusting the interference distance ID of the input interference members 349A.

Similarly output interference members 349B extend the interference distance ID into the interior of the manifold apparatus 301 from the inner surface 351B of the wall of the manifold housing 309 adjacent to a corresponding output ports 311 and are positioned such that a portion of the product granules 305 directed toward the corresponding output port 311 contact the output interference member 349B and are directed away from the adjacent corresponding output port 311. The output interference members 349B interfere with the passage of the product granules 305 to a greater or lesser extent depending on the interference distance ID such that again the rate of product flow through each output port 311 is changed by adjusting the interference distance ID of the output interference members 349B.

A blocking interference member 349C is shown extending the adjustable interference distance ID into one of the output ports 311 such that a cross-sectional area of the output port 311 is reduced to a greater or lesser degree, thus increasing back pressure at the output port 311 and reducing the amount of the air stream 303 and product granules 305 that passes through the output port 311.

Conveniently in the illustrated apparatus 301 the interference members 349 are provided by a threaded shaft 353 engaged in a threaded hole 357 in the wall of the manifold apparatus 301 and positioned such that an inner end 355 of the shaft 353 is in the interior of the manifold apparatus 301, either inside the input conduit 307 or the manifold housing 309. Since the wall of a typical input conduit 307 or manifold housing 309 is quite thin, the threaded hole 357 in the wall is conveniently provided by welding a nut 359 to the exterior of the manifold apparatus 301. The interference distance ID is then conveniently adjusted by rotating the shaft 353.

As in the apparatus 1 described above, product flow sensors 327 are operative to measure the rate of product flow through each output port 311 and a microprocessor 329 is connected to receive product flow rate information from each product flow sensor 327, and is programmed to determine when a tuned interference distance ID for each interference member 349 is achieved by determining that the rate of product flow through each output port 311 is within the selected range. It is contemplated that some increased damage may be caused, particularly to more brittle seeds like peas and lentils, by increased contact with the interference members 349, and so with these agricultural products it may be preferred to use the adjustable input conduit and distributor component rather than the interference members.

The disclosed manifold apparatus adjusts to change the path of the product granules passing through the apparatus to a greater or lesser degree to change the rate of flow of product granules through each output port and to achieve improved product distribution uniformity from the output ports. By measuring the output from the output port while making the described adjustments, product flows from each output port can be achieved that are within a selected range that is much narrower than is typically available on conventional air seeder manifolds.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A manifold apparatus for an air seeder, the apparatus comprising:
   a manifold housing enclosing a manifold interior, the manifold housing comprising a plurality of output ports substantially equally spaced around a perimeter of the manifold housing, each output port adapted for connection to an output conduit;
   an input port defined in a bottom side of the manifold housing, and a substantially vertically oriented input conduit extending downward from the input port;
   a distributor component formed by a bottom side of an upwardly extending top plate of the manifold housing above the input port, the distributor component configured to direct product granules moving upward in an air stream in the manifold interior outward toward the perimeter of the manifold housing;
   wherein a relative lateral position of the distributor component with respect to the input port is adjustable to achieve a tuned relative lateral position where a rate of product flow through each output port is within a selected range, wherein the distributor component is formed by at least the upwardly extending top plate;
   wherein the distributor component is laterally adjustable with respect to the manifold housing such that the distributor component can be moved to achieve the tuned relative lateral position with respect to the input port; and
   wherein a bottom side of the upwardly extending top plate curves smoothly outward and downward from an upper extremity thereof.

2. A manifold apparatus for an air seeder, the apparatus comprising:
   a manifold housing enclosing a manifold interior, the manifold housing comprising a plurality of output ports substantially equally spaced around a perimeter of the manifold housing, each output port adapted for connection to an output conduit;
   an input port defined in a bottom side of the manifold housing, and a substantially vertically oriented input conduit extending downward from the input port;
   a distributor component formed by a bottom side of a top plate of the manifold housing above the input port, the distributor component operative to direct product granules moving upward in an air stream in the manifold interior outward toward the perimeter of the manifold housing;
   wherein a relative lateral position of the distributor component with respect to the input port is adjustable to achieve a tuned relative lateral position where a rate of product flow through each output port is within a selected range;
   wherein the distributor component is laterally adjustable with respect to the manifold housing such that the distributor component can be moved to achieve the tuned relative lateral position with respect to the input port; and
   wherein a top side of the manifold housing defines a top aperture, and the top plate is fastened to seal the top aperture and is movable with respect to the top aperture.

3. A manifold apparatus for an air seeder, the apparatus comprising:
   a manifold housing enclosing a manifold interior, the manifold housing comprising a plurality of output ports substantially equally spaced around a perimeter of the manifold housing, each output port adapted for connection to an output conduit;
   an input port defined in a bottom side of the manifold housing, and a substantially vertically oriented input conduit extending downward from the input port;
   a distributor component formed by a bottom side of a top plate of the manifold housing above the input port, the distributor component operative to direct product granules moving upward in an air stream in the manifold interior outward toward the perimeter of the manifold housing;
   wherein a relative lateral position of the distributor component with respect to the input port is adjustable to achieve a tuned relative lateral position where a rate of product flow through each output port is within a selected range;
   wherein the input port is laterally adjustable with respect to the perimeter of the manifold housing such that the input port can be moved to achieve the tuned relative lateral position with respect to the distributor component; and
   wherein the bottom side of the manifold housing defines a bottom aperture with a diameter greater than a diameter of the input port, and wherein a top end of the input conduit has a diameter greater than the diameter of the input port and is fastened to the bottom side of the manifold housing within the bottom aperture and at a substantially fixed position with respect to the bottom aperture, and wherein the input port is defined by a choke plate adjustably fastened between the bottom side of the manifold housing and the top end of the input conduit such that the choke plate is movable laterally, and such that the input port is within the bottom aperture.

4. The apparatus of claim 3 comprising a flange extending outward from the top end of the input conduit and fastened to the bottom side of the manifold housing by bolts through close fitting holes such that a position of the flange with respect to the bolts and with respect to the bottom side of the manifold housing is substantially fixed, and wherein the bolts extend through oversize holes in the choke plate such that a position of the choke plate with respect to the bolts and with respect to the bottom side of the manifold housing can be adjusted.

5. A manifold apparatus for an air seeder, the apparatus comprising:
   a manifold housing enclosing a manifold interior, the manifold housing comprising a plurality of output ports substantially equally spaced around a perimeter of the manifold housing, each output port adapted for connection to an output conduit;
   an input port defined in a bottom side of the manifold housing, and a substantially vertically oriented input conduit extending downward from the input port;

a distributor component formed by a bottom side of a top plate of the manifold housing above the input port, the distributor component operative to direct product granules moving upward in an air stream in the manifold interior outward toward the perimeter of the manifold housing;

wherein a relative lateral position of the distributor component with respect to the input port is adjustable to achieve a tuned relative lateral position where a rate of product flow through each output port is within a selected range;

a product flow sensor corresponding to each output port, each product flow sensor operative to measure the rate of product flow through the corresponding output port; and a microprocessor connected to receive product flow rate information from each product flow sensor, and programmed to determine when the tuned lateral position of the distributor component with respect to the input port is achieved by determining that the rate of product flow through each output port is within the selected range.

6. The apparatus of claim 5 wherein the tuned lateral position of the distributor component with respect to the input port is determined by trial and error by repeatedly changing the relative lateral positions thereof and measuring the product flow through each output port after each change.

7. A manifold apparatus for an air seeder, the apparatus comprising:

a manifold housing defining a plurality of output ports substantially equally spaced around a perimeter of the manifold housing, each output port adapted for connection to an output conduit;

an input port defined in a bottom side of the manifold housing;

a substantially vertically oriented input conduit extending downward from the input port and carrying an air stream entrained with product granules such that the air stream entrained with product granules flows upward into the manifold interior and out through the output ports;

a plurality of interference members, each interference member adjustable with respect to the manifold apparatus such that same can be moved from an inoperative position outside an interior of the manifold apparatus to an operative position extending an interference distance from an inner surface of a wall of the manifold housing into a path of the air stream entrained with product granules;

wherein the interference distance for each interference member is adjustable; and wherein a rate of product flow through each output port is changed by adjusting the interference distance of the interference members.

8. The apparatus of claim 7 wherein at least one input interference member extends the interference distance into an interior of the input conduit from an inner surface of a wall of the input conduit.

9. The apparatus of claim 8 comprising a plurality of input interference members substantially equally spaced around an inner surface of the input conduit.

10. The apparatus of claim 7 wherein an output interference member extends the interference distance into the manifold interior adjacent to a selected output port and positioned such that a portion of the product granules directed toward the selected output port contact the output interference member.

11. The apparatus of claim 7 wherein a blocking interference member extends the interference distance into a selected output port such that a cross-sectional area of the selected output port is reduced.

12. The apparatus of claim 7 wherein at least one interference member is provided by a threaded shaft engaged in a threaded hole in the wall of the manifold housing and positioned such that an inner end of the shaft is in the path of the air stream entrained with product granules, and wherein the interference distance is adjusted by rotating the shaft.

13. The apparatus of claim 7 comprising a product flow sensor corresponding to each output port, each product flow sensor operative to measure the rate of product flow through the corresponding output port, and a microprocessor connected to receive product flow rate information from each product flow sensor, and programmed to determine when a tuned interference distance for each interference member is achieved by determining that the rate of product flow through each output port is within the selected range.

* * * * *